United States Patent [19]

Buffone

[11] 4,429,855
[45] Feb. 7, 1984

[54] HAND WHEEL FOR BOTTOM OPERATED TANK CAR VALVE

[75] Inventor: Angelo J. Buffone, Chesterfield, Mo.

[73] Assignee: ACF Industries, Inc., New York, N.Y.

[21] Appl. No.: 301,179

[22] Filed: Sep. 11, 1981

[51] Int. Cl.³ ............................................. F16K 51/00
[52] U.S. Cl. ..................... 251/144; 251/292; 251/293; 137/556
[58] Field of Search .............. 251/144, 291, 292, 293; 137/553, 556

[56] References Cited

U.S. PATENT DOCUMENTS

| | | | |
|---|---|---|---|
| 944,534 | 12/1909 | Beamon | 251/292 |
| 1,526,890 | 2/1925 | Wilson | 251/144 |
| 1,634,781 | 7/1927 | Hall | 137/553 |
| 1,663,606 | 3/1928 | Murphy | 251/293 |
| 1,740,319 | 12/1929 | Stancu, Jr. | 251/291 |
| 1,786,750 | 12/1930 | Hasselquist et al. | 251/144 |
| 1,878,569 | 9/1932 | Zolleis | 251/292 |
| 2,851,901 | 9/1958 | Kortier et al. | 251/293 |
| 4,095,494 | 6/1978 | Castoe | 81/177.8 |
| 4,198,032 | 4/1980 | Hillstead et al. | 251/144 |

Primary Examiner—A. Michael Chambers
Attorney, Agent, or Firm—Henry W. Cummings

[57] ABSTRACT

A hand wheel for operation of a tank car valve located in the tank bottom is provided. The hand wheel is connected to an operating shaft for the tank car valve and includes a body portion having at least one first opening adapted to receive a horizontally extending tool to rotate the valve. The hand wheel also includes an opening in its bottom surface which is adapted to receive another operating tool such as a drive ratchet or a ratchet extension to open and close the lading valve.

10 Claims, 6 Drawing Figures

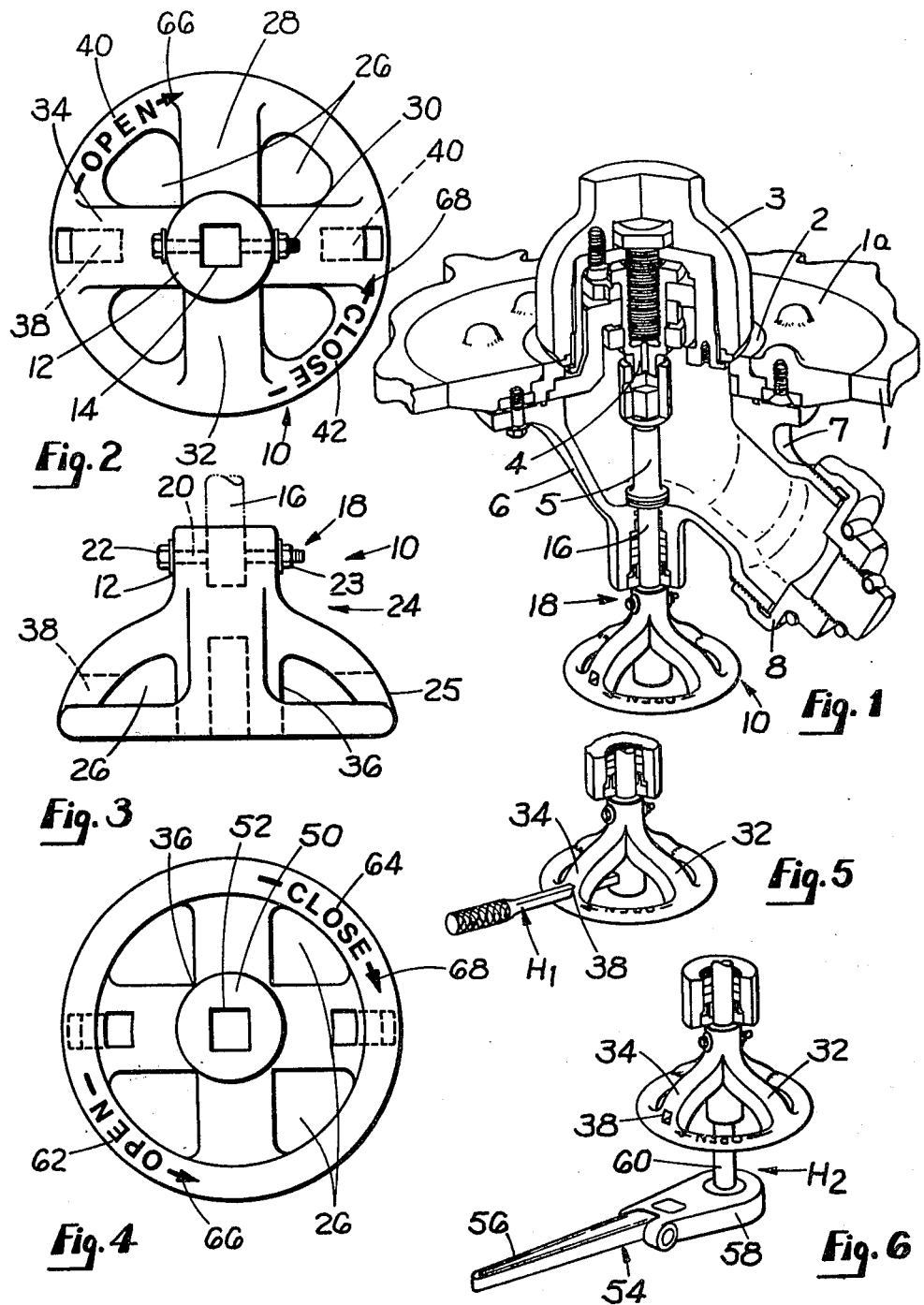

HAND WHEEL FOR BOTTOM OPERATED TANK CAR VALVE

BACKGROUND OF THE INVENTION

In U.S. Pat. No. 4,198,032 granted Apr. 15, 1980, a bottom operated tank car lading valve is disclosed which is operated by means of an operating shaft extending downwardly below the tank bottom. The operating shaft is provided with a cap. To open or close the lading valve, the cap is removed and a suitable operating tool is attached to a lower nonround end of the operating shaft. However, this arrangement is undesirable because only tools having a nonround opening may be utilized to operate the shaft. Thus, pinch bars and ratchet extensions cannot readily be utilized in this arrangement.

In U.S. Pat. No. 4,212,447 granted July 15, 1980, a captive handle assembly is disclosed for rotating the operating shaft connected to the bottom outlet valve. The handle is pivotably mounted adjacent the lower end of the operating shaft and the distal end is removably mounted adjacent the tank bottom. In use, the handle is pivoted nearly 90° and is used to rotate the operating shaft and move the lading valve between open and closed positions. In one embodiment, a nonround handle portion is in continuous engagement with the operating shaft. In another embodiment, the handle portion is moved longitudinally to achieve engagement with the operating shaft. In a third embodiment, the handle includes a ratchet assembly which is in continuous engagement with the operating shaft.

However, these captive handle assemblies are expensive. Customers resist the added cost and point out that they have available in the yard a variety of suitable tools such as pinch bars and ratchets, and therefore do not wish to pay the added cost of a captive handle.

SUMMARY OF THE INVENTION

The object of the invention is to provide a connection arrangement for the lower portion of a tank car bottom operated lading valve shaft which is relatively inexpensive and which will receive male ended operating tools which are commonly available in rail yards such as pinch bars and ratchet extensions.

In accordance with the present invention, a tank car lading valve is located within an opening in the tank bottom. The lading valve includes a downwardly extending operating shaft having a lower nonround portion. A hand wheel is provided and hand wheel connecting means are provided to removably connect the operating shaft to the hand wheel. The hand wheel includes a body portion which is preferably circular and which includes at least one nonround opening adapted to receive a generally horizontally extending male operating tool. The hand wheel also includes in its lower surface a second opening adapted to receive a second male operating tool such as a ratchet or a ratchet extension. Thus with the hand wheel of the present invention, flexibility for the attendant in the field is achieved whereby he may utilize the readily available operating tools having male ends to open and close a tank car lading valve.

IN THE DRAWINGS

FIG. 1 is a vertical sectional view illustrating a tank car lading valve which is movable between open and closed positions by means of a hand wheel of the present invention.

FIG. 2 is a plan view of the hand wheel of the present invention.

FIG. 3 is a side elevation view of the hand wheel.

FIG. 4 is a bottom view of the hand wheel.

FIG. 5 is a perspective view of operation of the hand wheel by means of a horizontally extending male ended operating tool.

FIG. 6 is a perspective view of the hand wheel and illustrating operation of the hand wheel by means of a ratchet and ratchet extension.

DESCRIPTION OF PREFERRED EMBODIMENTS

In the drawings a tank bottom 1 has mounted therein a tank mounting flange 1a and a valve seat 2. Valve member 3 in closed position rests upon the seat and includes a connection portion 4. Operating shaft 5 depends from the valve and passes through an outlet chamber 6 having a spout 7 and a removable cap 8.

The hand wheel of the present invention is indicated generally at 10. The hand wheel includes an upper connection portion 12 which is conveniently circular and includes a nonround opening 14 conveniently square, adapted to receive a lower operating shaft portion 16 extending downwardly from operating shaft 5. Means indicated at 18 are provided to removably connect the hand wheel to the operating shaft 16. In one embodiment the connecting means 18 comprises a shoulder bolt 20 having a head 22 and which is held in place extending through the hand wheel and the operating shaft by a suitable stop nut 23. Other connecting means to connect the operating shaft to the hand wheel will be apparent to those skilled in the art.

The hand wheel next includes a body portion 24 which extends downwardly and outwardly from the connecting portion 12. The body portion 24 is generally circular and includes a circumferential portion 25. However, void areas 26 are provided to reduce the weight of the wheel and inwardly extending ribs 28 and 30, 32 and 34 extend inwardly to a hub portion 36. In at least one of the rib portions 28, 30, 32, and 34, a nonround opening 38 is provided. The nonround opening extends inwardly through rib portion 34. The nonround opening 38, for example, may be of square cross section, for example ¾" to 1" on a side. Opening 38 is adapted to receive a suitable tool H, to rotate the hand wheel and the operating shaft 16 back and forth (FIG. 5). For example, opening 38 is adapted to receive a pinch bar which is commonly available in railroad loading and unloading sites.

It is preferred to provide at least one additional opening 40 similar to the opening 38, for example located in rib 30, 180° away so that the hand wheel may be operated from either side of the car. Additional nonround openings may also be provided in rib portions 28 and 32 if desired. Preferably, as an aid to the attendant in the field, rotational direction indications are cast or embossed on the circumferential portion 25. Thus open and closed indications are cast or embossed on at 40 and 42 for rotation respectively in the clockwise and counterclockwise directions.

In the bottom surface 50, a second opening 52 is provided also of nonround shape, conveniently a square in the hub portion 36 of the hand wheel. While opening 52 is adapted to receive a wide variety of male ended operating tools, $H_2$ among those particularly contemplated are male ended ratchets and ratchet extensions. For examle, as illustrated in FIG. 3, a ratchet 54 includes a ratchet handle 56, a ratchet operating portion 58 and a ratchet extension 60 which extends into opening 52. Such ratchet assemblies are readily available in rail yards and their construction is known and conventional. See for example U.S. Pat. No. 4,095,494.

It is also preferred to cast or emboss the rotational directions indicated at 62 and 64 on the bottom of the hand wheel preferably including the arrows 66 and 68 as illustrated in FIGS. 2 and 4. As was the case with openings 38 and 40, opening 52 may for example be ¾" to 1" on the side.

It is also to be pointed out that openings 38, 40 and 52 may be other shapes than square, for example, hexagons and octagons may be used.

It will be apparent that the shaft portion 6 can be rotated by inserting a suitable male ended tool into opening 38, into opening 40, or into bottom opening 52. The choice is up to the attendant in the field. The amount of rotation will depend upon the particular bottom outlet valve utilized. For example, the bottom outlet valve illustrated in the above mentioned U.S. Pat. Nos. 4,212,447 and 4,198,032, hereby incorporated into this application by this reference, may be referred to for a detailed description of one suitable low profile tank car valve requiring approximately six turns of the hand wheel 10 to move the lading valve between open and closed position. On the other hand, ball valves commonly utilized as in tank cars, will require only approximately 90° of rotation. Application Ser. No. 134,050 filed Mar. 26, 1980, hereby incorporated into this application by this reference, may be referred to for a description of operation of a ball valve by virtue of a depending operating shaft which may be attached to the hand wheel of the present invention.

What is claimed is:

1. A connection arrangement for the lower portion of a tank bottom operating lading valve shaft wherein a tank lading valve is located within the tank and wherein the lading valve includes a downwardly extending operating shaft having a lower connection portion comprising: a hand wheel including an upper connection portion having a nonround slot to receive said operating shaft; hand wheel connecting means connecting the operating shaft to the hand wheel; said hand wheel including a body portion; said hand wheel body portion comprising a circumferential portion and a hub portion and wherein ribs extend between said circumferential portion and said hub portion; and wherein spaces are provided between said ribs; at least one nonround side opening extending through at least one of said ribs adapted to receive a generally horizontally extending operating tool; said hand wheel also including in its lower surface a bottom opening adapted to receive an operating tool whereby the attendant may utilize said ribs, said side opening and/or said bottom opening to rotate said hand wheel and said operating shaft to move said lading valve between open and closed positions.

2. A connection arrangement according to claim 1, wherein a second side opening is provided in said hand wheel also adapted to receive a generally horizontal extending operating tool.

3. A connection arrangement according to claim 1, wherein said hand wheel connecting means comprises a removable connection between the hand wheel and the operating shaft.

4. A connection arrangement according to claim 3, wherein said removable connecting means comprises a removable pin extending through said hand wheel and said shaft.

5. A connection arrangement according to claim 1, wherein rotational indicating means are provided on said hand wheel to indicate to the attendant which direction to rotate the hand wheel to move said lading valve respectively toward open and closed positions.

6. A connection arrangement according to claim 5, wherein said indicating means comprises words and/or arrows indicating which direction to rotate the handle.

7. A connection arrangement according to claim 6, wherein said indicating means comprises the words open and/or close(d).

8. A connection arrangement according to claim 1, wherein first and second side openings are located within said ribs.

9. A connection arrangement according to claim 1, wherein said bottom opening is located generally in the center of the hand wheel.

10. A connection arrangement according to claim 1, wherein said side opening is of square cross section and said bottom opening is of square cross section.

* * * * *